BEST AVAILABLE COPY

C. I. KANE.

Shuttle-Motion for Looms.

No. 6,702. Reissued Oct. 19, 1875.

Fig. 3

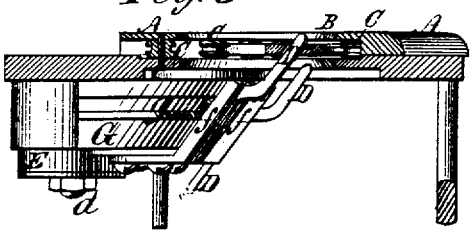

Fig. 2

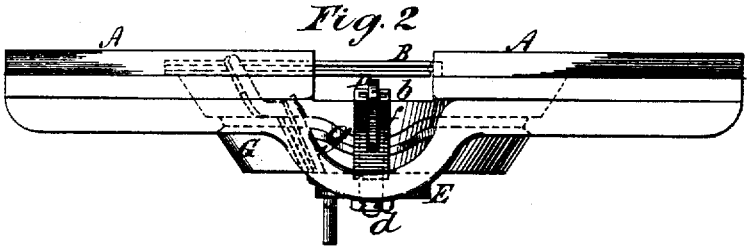

Fig. 1

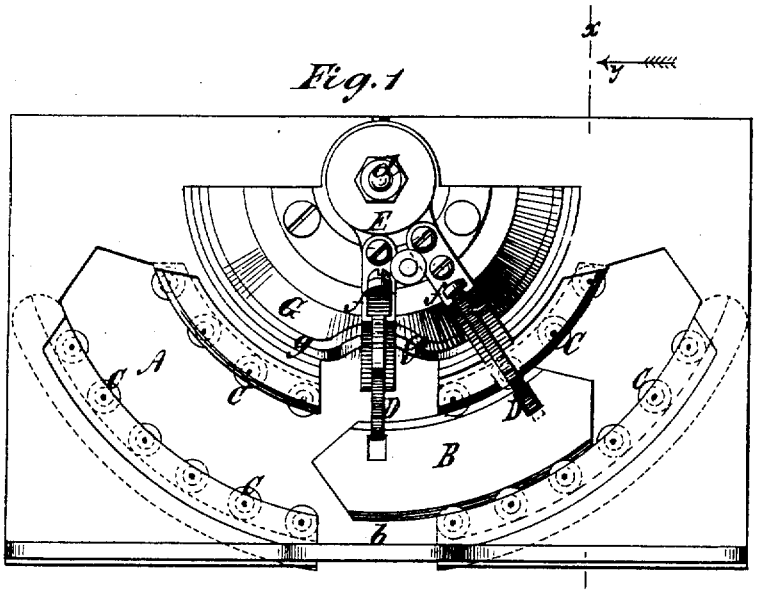

6,702. Shuttle-Motions for Looms. C. I. Kane, Milford, Conn. Patent No. 167,176, dated Aug. 31, 1875. [Filed Sept. 28, 1875.]

1. The raceway composed of or provided, both on its front and back edges, with flanged or grooved guide-rollers, in combination with a shuttle having its bearing-edges constructed to correspond, whereby said shuttle is not only directed but supported by the rollers, substantially as specified.

2. The combination, with the shuttle operating in a circular or curved raceway, of the oscillating and longitudinally-sliding shuttle-driving fingers D D, occupying an inclined position relative to the plane of the raceway, the driver or carrier E oscillating about an axis perpendicular to the plane of the raceway, and the stationary conical cam G, substantially as described.

Witnesses:
Michael Ryan
Geo Haynes

Charles I. Kane
by his Attorneys
Brown & Allen

N. PETERS, PHOTO-LITHOGRAPHER, WASHINGTON, D. C.

BEST AVAILABLE COPY

UNITED STATES PATENT OFFICE.

CHARLES I. KANE, OF MILFORD, CONNECTICUT.

IMPROVEMENT IN SHUTTLE-MOTIONS FOR LOOMS.

Specification forming part of Letters Patent No. 167,176, dated August 31, 1875; reissue No. 6,702, dated October 19, 1875; application filed September 28, 1875.

*To all whom it may concern:*

Be it known that I, CHARLES I. KANE, of Milford, in the county of New Haven and State of Connecticut, have invented certain new and useful Improvements in Shuttle-Motions for Looms; and I do hereby declare that the following is a full, clear, and exact description of the same, reference being had to the accompanying drawing forming part of this specification.

This invention more particularly relates to looms for weaving narrow goods, and in which a raceway for the shuttle, open both above and below, is used.

The invention consists, first, in an open raceway composed of or provided on its opposite edges with grooved or flanged guide-rollers for both directing the shuttle in its course and for supporting the same, and whereby the use of oil or lubricating material to facilitate the run of the shuttle, and which is apt to soil the goods, is dispensed with.

The invention also has reference to looms, more particularly narrow-ware looms, in which the shuttle is reciprocated in the arc of a circle by oscillating and longitudinally-sliding fingers or drivers, substantially as described in Letters Patent No. 137,077, issued to me March 25, 1873, and whereby provision is made for a very rapid motion. The invention in such relations consists in a novel combination of devices whereby not only said fingers or drivers are made to enter the shuttle in an upward direction from below the latter, instead of working on a plane parallel with the shuttle-race, which upward-entering motion of the fingers is preferable for many reasons, but whereby said action and the timely withdrawal of the fingers or drivers in a downward direction is obtained in a most simple and perfect manner, and springs to control such entering or withdrawing action of the shuttle-drivers are, or may be, dispensed with.

As in my patented loom hereinbefore referred to, either a single web or several webs may be woven in the same loom, but the necessary parts will here only be shown as adapted to weaving a single web, said parts being duplicated or multiplied when weaving more than one web.

Figure 1 represents an inverted plan of the shuttle portion of a loom constructed in accordance with my invention. Fig. 2 is a front view of the same; and Fig. 3 a transverse vertical section thereof on the line *x x*, looking in direction of the arrow *y*.

A is the raceway in which the shuttle B, that should be provided with the usual bobbin, works. Said raceway is open both above and below, and is composed or provided on its front and back or opposite edges of or with grooved or flanged guide-rollers C, which, by their construction, not only serve to direct the shuttle in the line of a raceway, but also to support the shuttle, the latter on its edges being made to fit the grooves or flanges of the guide-rollers. By this construction of the raceway and shuttle to suit, oil or lubricating material to facilitate the run of the shuttle, and which is apt to soil the goods, is dispensed with.

The raceway A, shown in the drawing, is of an arc shape, or in the form of a circle, the plane of which is parallel or nearly so, with that in which the web is moved, and perpendicular to the harness motion. Said raceway is stationary, for use in combination with a lay or beater having a reciprocating motion, and has its outer edge constructed with an opening, *b*, wide enough for the free passage of the warp.

When the raceway is of a curved form, as shown, the shuttle B is of corresponding curvature on its edges, and the same may be constructed, as in my patent hereinbefore referred to, of a thin flat frame. It is very desirable, in fact, to have the shuttle as thin as possible essentially at its front edge to reduce the necessary width of opening the shed. To this end, and to do away with the crossing of the shuttle drivers or fingers D, and to operate the latter from the front side of their center of oscillating motion *d*, which is concentric with the raceway, said fingers are made to come up from below to gear alternately with the opposite ends of the shuttle, thus dispensing with projections on the bottoms of the shuttle for reception of the fingers, and are operated as follows: The oscillating shuttle-driver or finger-carrier E is constructed with slotted arms or guides *f*, which are set inclining to travel over or against a conical stationary grooved cam, G, in front of the center of motion *d*, and with the groove *g* of which the fingers D gear

BEST AVAILABLE COPY by means of rollers on their faces to give to said fingers their necessary up and down motions for alternate driving connections with and clearance of the shuttle, as required, as the carrier E is oscillated from *d* as a center of motion. This combination of means, in which the conical stationary grooved cam G is an important element, involves but few parts to give the desired up and down entering and withdrawing action to the shuttle-operating fingers or drivers, and springs for controlling their entering action within the shuttle may be dispensed with.

It will be observed that by the construction of the conical cam the devices are brought into a compact mass, the simplicity of the machine is greatly increased, and by the arrangement of the fingers in an inclined or oblique position, by which they move not only upward and downward, but forward and backward, it has been found much better in practice for the reason that by such movement the withdrawal of the fingers or drivers in a downward direction is obtained in a timely, positive, and most simple and perfect manner.

I claim—

1. The raceway composed of or provided, both on its front and back edges, with flanged or grooved guide-rollers, in combination with a shuttle having its bearing-edges constructed to correspond, whereby said shuttle is not only directed but supported by the rollers, substantially as specified.

2. The combination, with the shuttle operating in a circular or curved raceway, of the oscillating and longitudinally-sliding shuttle-driving fingers D D, occupying an inclined position relative to the plane of the raceway, the driver or carrier E oscillating about an axis perpendicular to the plane of the raceway, and the stationary conical cam G, substantially as described.

CHARLES I. KANE.

Witnesses:
HENRY T. BROWN,
MICHAEL RYAN.